United States Patent
Kapoor et al.

(10) Patent No.: US 7,257,606 B2
(45) Date of Patent: *Aug. 14, 2007

(54) METHODS OF SNAPSHOT AND BLOCK MANAGEMENT IN DATA STORAGE SYSTEMS

(75) Inventors: Vikram Kapoor, Sunnyvale, CA (US); Kurt Alan Shoens, Los Altos, CA (US); Mark Steven Schultz, Los Altos, CA (US); Rex Rilen Hamilton, Ben Lomond, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/147,739

(22) Filed: Jun. 7, 2005

(65) Prior Publication Data

US 2005/0240635 A1    Oct. 27, 2005

Related U.S. Application Data

(63) Continuation of application No. 10/616,128, filed on Jul. 8, 2003, now Pat. No. 6,959,313.

(51) Int. Cl.
G06F 17/30 (2006.01)
(52) U.S. Cl. ............. 707/205; 707/203; 707/204; 711/162
(58) Field of Classification Search ........ 707/200–205; 711/161–162
See application file for complete search history.

(56) References Cited

U.S. PATENT DOCUMENTS 5,317,731 A    5/1994   Dias et al.

(Continued)

FOREIGN PATENT DOCUMENTS

WO    WO 02/29573 A2    4/2002

OTHER PUBLICATIONS

McKusick, Joy, Leffler, and Fabry, A Fast File System for UNIX, ACM Transactions on Computer Systems, Aug. 1984, pp. 181-197, vol. 2, No. 3, US.

(Continued)

*Primary Examiner*—Debbie Le
(74) *Attorney, Agent, or Firm*—Robert Moll

(57) ABSTRACT

The present invention relates to methods and systems of snapshot management of a file system in a data storage system. To represent the snapshots, the invention maintains pointers to the root block pointer of each snapshot. When the active file system is modified, this invention avoids overwriting any blocks used by previous snapshots by allocating new blocks for the modified blocks. When the invention needs to put an established block in a new location, it must update a parent block to point to the new location. The update to the parent block may then require allocating a new block for the new parent block and so forth. Parts of the file system not modified since a snapshot remain in place. The amount of space required to represent snapshots scales with the fraction of the file system that users modify. To maintain snapshot integrity, this invention keeps track of the first and last snapshots that use each block in space map blocks spread throughout the file system data space. When users delete snapshots, this invention may use a background process to find blocks no longer used by any snapshot and makes them available for future use.

16 Claims, 16 Drawing Sheets

U.S. PATENT DOCUMENTS

| | | |
|---|---|---|
| 5,664,186 A | 9/1997 | Bennett et al. |
| 5,819,292 A | 10/1998 | Hitz et al. |
| 6,038,639 A * | 3/2000 | O'Brien et al. ............. 711/114 |
| 6,085,298 A * | 7/2000 | Ohran ........................ 711/162 |
| 6,205,450 B1 | 3/2001 | Kanome |
| 6,247,099 B1 | 6/2001 | Skazinski et al. |
| 6,289,356 B1 | 9/2001 | Hitz et al. |
| 6,311,193 B1 | 10/2001 | Sekido |
| 6,484,186 B1 | 11/2002 | Rungta |
| 6,490,659 B1 | 12/2002 | McKean et al. |
| 6,636,878 B1 | 10/2003 | Rudoff |
| 6,636,879 B1 | 10/2003 | Doucette et al. |
| 6,883,074 B2 | 4/2005 | Lee et al. |
| 6,938,134 B2 | 8/2005 | Madany |
| 6,959,313 B2 * | 10/2005 | Kapoor et al. ............. 707/205 |
| 6,978,353 B2 | 12/2005 | Lee et al. |
| 7,072,916 B1 | 7/2006 | Lewis et al. |
| 7,111,021 B1 | 9/2006 | Lewis et al. |
| 2002/0049718 A1 | 4/2002 | Kleiman et al. |
| 2002/0083037 A1 | 6/2002 | Lewis et al. |
| 2002/0091670 A1 | 7/2002 | Hitz et al. |
| 2002/0133735 A1 | 9/2002 | McKean et al. |
| 2003/0018878 A1 | 1/2003 | Dorward et al. |
| 2004/0133602 A1 | 7/2004 | Kusters et al. |
| 2006/0107006 A1 * | 5/2006 | Green et al. ................ 711/162 |

OTHER PUBLICATIONS

McKusick and Ganger, Soft Updates: A Technique for Eliminating Most Synchronous Writes in the Fast Filesystem, Proceedings of the FREENIX Track: 1999 USENIX Annual Technical Conference, Jun. 6-11, 1999, pp. 1-18, Monterey, US.

Rosenblum and Ousterhout, The Design and Implementation of a Log-Structured File System, ACM Transactions on Computer Systems, Feb. 1992, pp. 26-52, vol. 10, No. 1, Berkeley, US.

Rosenberg, Dearle, Hulse, Lindstrom and Norris, Operating System Support for Persistant and Recoverable Computations, Communications of The ACM, Sep. 1996, pp. 62-69, vol. 39, No. 9, US.

Lee and Thekkath, Petal: Distributed Virtual Disks, copyrighted 1996, pp. 84-92, ACM, Inc. MA, US.

Supplementary European Search Report for European Patent Application No. EP 04756637, Published Jan. 1, 2007.

PCT International Search Report for International Application No. PCT/US04/21476, Published May 10, 2005.

U.S. Appl. No. 60/419,252, filed Jun. 8, 2004, Kusters et al.

Thekkath, Mann, and Lee, Frangipani: A Scalable Distributed File System, copyrighted 1997, pp. 224-237, ACM, Inc. Saint-Malo, France.

* cited by examiner

Create A File System

Clean Obsolete Snapshots

Multiple File System Reversions
To Snapshot "p" And To Snapshot "s"
Prior To Completing Background Cleaning Process

METHODS OF SNAPSHOT AND BLOCK MANAGEMENT IN DATA STORAGE SYSTEMS

This is a continuation of U.S. application Ser. No. 10/616,128, filed on Jul. 8, 2003 now U.S. Pat. No. 6,959,313, which is hereby incorporated by reference.

BACKGROUND

The present invention relates to snapshots of file systems in data storage systems.

This application incorporates herein by reference as follows:

U.S. application Ser. No. 10/354,797, Methods and Systems of Host Caching, filed on Jan. 29, 2003, now U.S. Pat. No. 6,965,979 B2;

U.S. application Ser. No. 10/440,347, Methods and Systems of Cache Memory Management and Snapshot Operations, filed on May 16, 2003, now U.S. Pat. No. 7,124,243 B2; and U.S. application Ser. No. 10/600,417. Systems and Methods of Data Migration in Snapshot Operations, filed on Jun. 19, 2003, now U.S. Pat. No. 7,136,974 B2.

Files exist to store information on storage devices (e.g., magnetic disks) and allow the information to be retrieved later. A file system is a collection of files and directories plus operations on them. To keep track of files, file systems have directories. A directory entry provides the information needed to find the blocks associated with a given file. Many file systems today are organized in a general hierarchy (i.e., a tree of directories) because it gives users the ability to organize their files by creating subdirectories. Each file may be specified by giving the absolute path name from the root directory to the file. Every file system contains file attributes such as each file owner and creation time and must be stored somewhere such as in a directory entry.

A snapshot of a file system will capture the content (i.e., files and directories) at an instant in time. A snapshot results in two data images: (1) the active data that an application can be read and write as soon as the snapshot is created and (2) the snapshot data. Snapshots can be taken periodically, hourly, daily, or weekly or on user demand. They are useful for a variety of applications including recovery of earlier versions of a file following an unintended deletion or modification, backup, data mining, or testing of software.

The need for high data availability often requires frequent snapshots that consume resources such as memory, internal memory bandwidth, storage device capacity and the storage device bandwidth. Some important issues for snapshots of file systems is how to manage the allocation of space in the storage devices, how to keep track of the blocks of a given file, and how to make snapshots of file systems work efficiently and reliably.

SUMMARY OF THE INVENTION

The invention provides methods and systems for management of snapshots of a file system.

In a first aspect of the invention, a snapshot management system performs a method for managing multiple snapshots and an active file system by (a) maintaining an index table that contains an entry for each snapshot and the active file system; and (b) maintaining space map block entry (b, e) where b and e represent index table entries, b indicates a first snapshot that uses the first block and e indicates a last snapshot that uses the first block.

In a second aspect of the invention, a snapshot management system includes a processor for maintaining multiple snapshot versions and an active file system, comprising: (a) an index table that contains an entry for each snapshot and the active file system; (b) a space map block including space map block entry (b, e), wherein b and e represent index table entries, b indicates a first snapshot that uses the first block, and e indicates a last snapshot that uses the first block; and (c) a usable space for storing the snapshot versions and the active file system.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
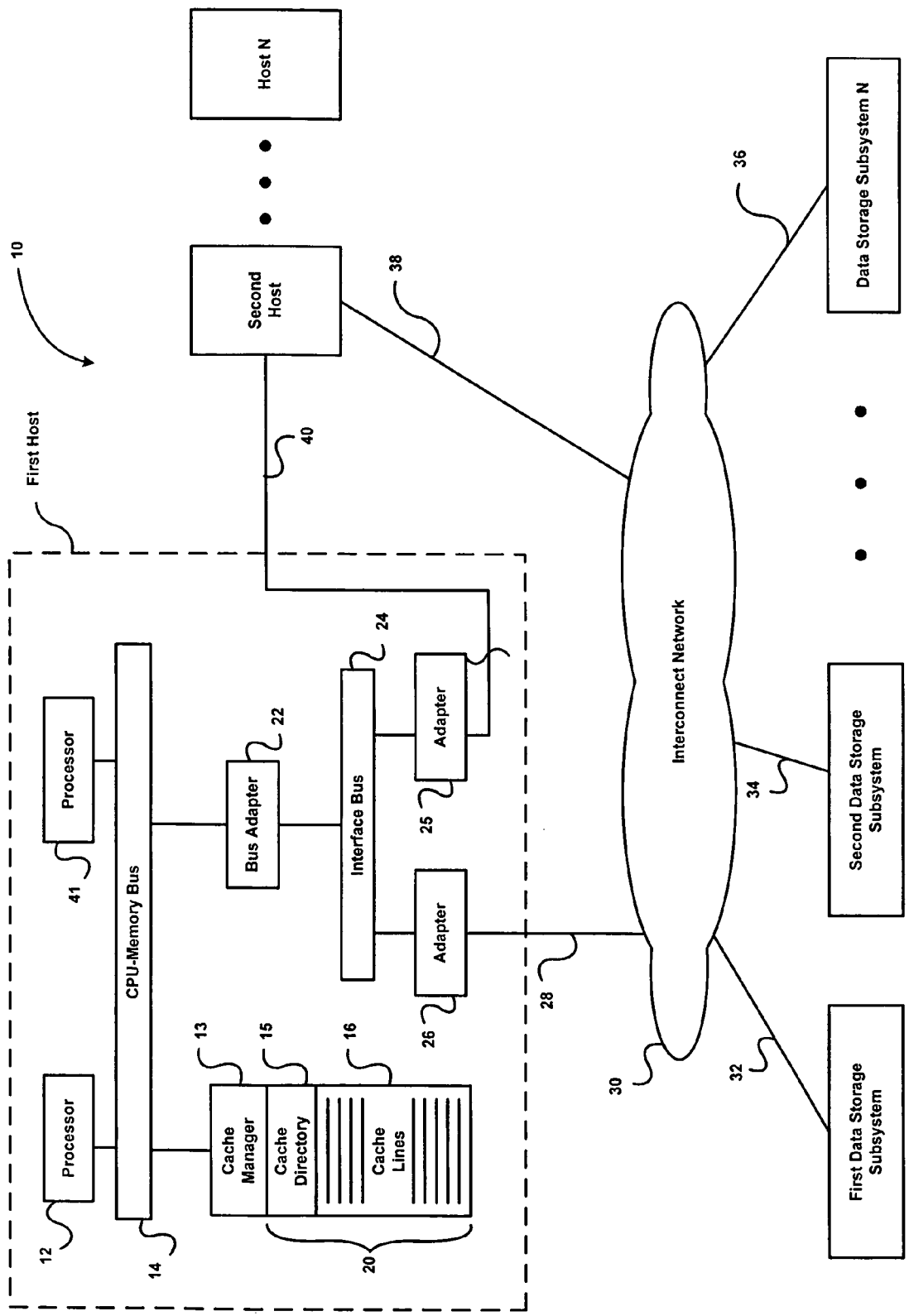
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. A processor could be any suitable general purpose processor running software, an ASIC dedicated to perform the operations described herein or a field programmable gate array (FPGA). Also, one could implement the invention using a single processor in each host or more than two processors to meet more stringent performance requirements. The arrangement of the processors is not essential to the invention.

The first host cache memory 20 includes a cache manager 13, a cache directory 15, and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, *Systems and Methods of Multiple Access Paths to Single Ported Storage Devices*, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O path plus link 32 to communicate with the first data storage subsystem, or link 34 to communicate with the second data storage subsystem, or link 36 to the data storage subsystem N.

Figure 2:
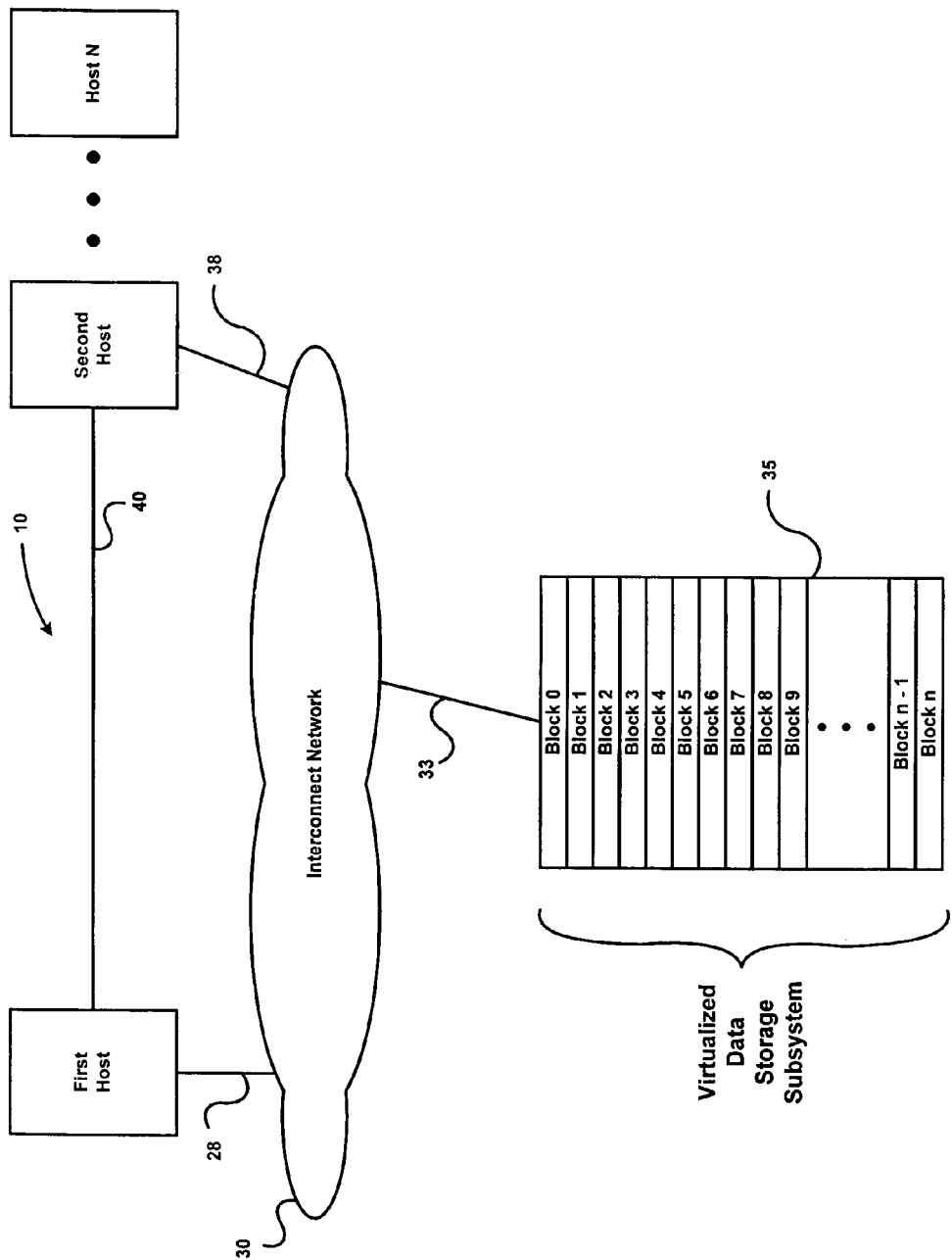
FIG. 2 illustrates the data storage as a virtualized storage subsystem.

FIG. 2 illustrates that each host of the data storage system can store and retrieve files from a data storage subsystem 35 using an interconnect 28, an interconnect 33, and an interconnect network 30. In an embodiment, each storage device in the data storage subsystem is assigned a logical unit number (LUN) that is an identifier for the storage device. A virtual logical unit number (VLUN) is as an abstraction of the storage device(s) or the virtualization of the data storage subsystems such as a linear array of blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability. As shown, the storage devices of the data storage subsystem are virtualized as a file system employing contiguous fixed sized blocks 0-n where the size of each block is some value preferably 1-KB to 64-KB.

Figure 3:
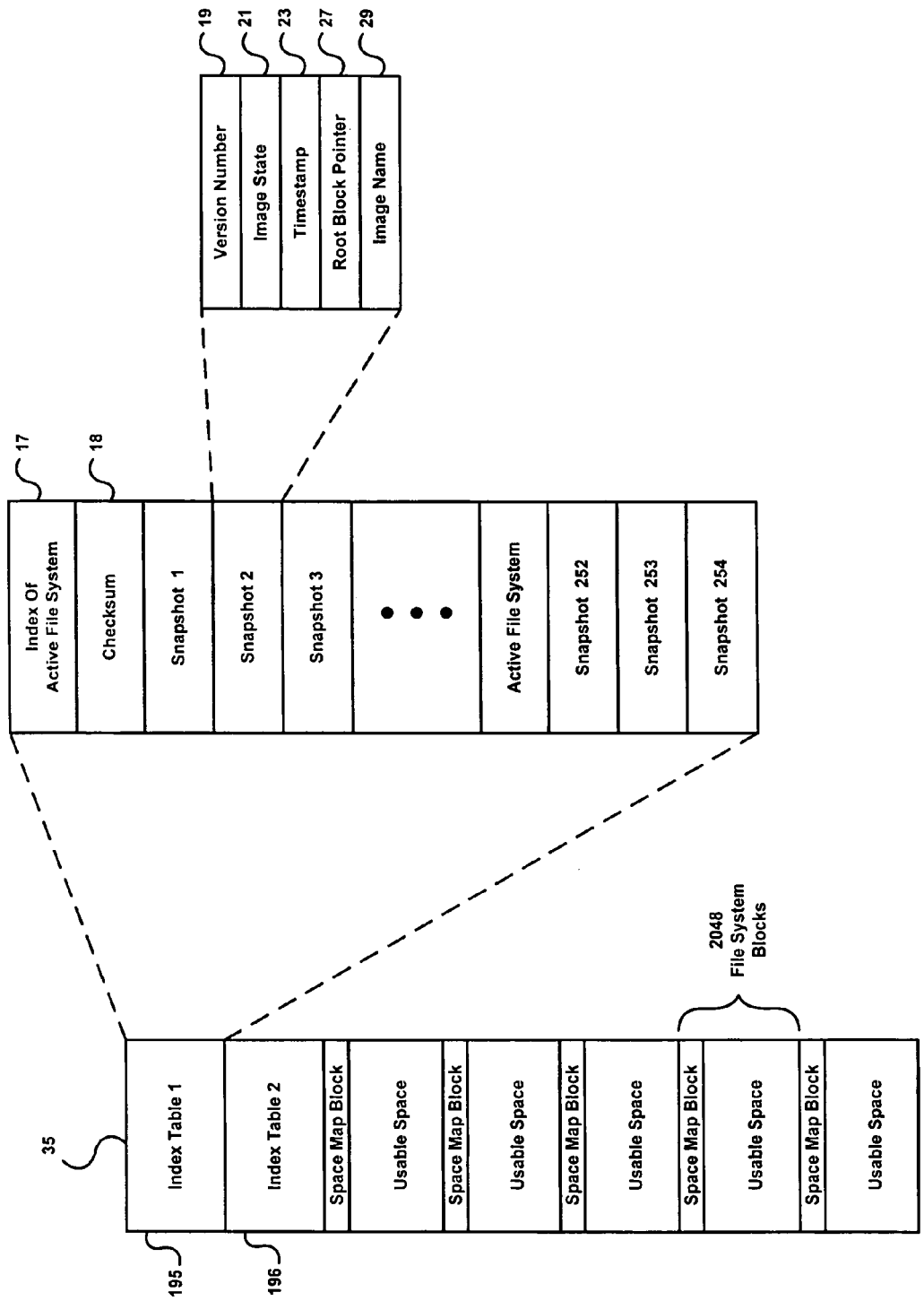
FIG. 3 illustrates details of the virtualized data storage subsystem organized into file system blocks including, snapshot tables, space map blocks, and usable file system data space.

FIG. 3 illustrates a data storage subsystem for maintaining (e.g., allocating, reading, writing, and deallocating) some blocks for index tables, some for space maps, and others for usable space for data storage. The block(s) allocated to an index table depends on the size of each block and the number of concurrent snapshots supported. For example, three 8-KB blocks may be sufficient space to support an index table of 254 snapshots. As shown, the file system has a pair of index tables 195 and 196 and thus uses six 8-KB blocks so the host can alternate writes to the index tables to ensure recovery in case of a data storage system failure. Thus, if the system fails during a write to one index table, the host can retrieve the unmodified copy of the other index table. While we describe this method of writing to alternate index table copies, other methods, such as write journaling, can be used to protect against system failure during index table writes. The remainder of the storage is allocated to space map blocks with usable space for data storage.

Each index table includes an index value of the active file system 17 permitting fast location of the active file system. The index table includes a known algorithm to verify the data integrity such as a checksum 18, a cyclic redundancy check, or a digital signature. The index table provides an index to the snapshots and the active file system. Each entry in the index table represents a snapshot or the active file system. As illustrated, the index range is 1-255, but this range is not essential to the invention. In various embodiments, each snapshot and the active file system has one or more associated attributes such as a version number 19, timestamp 23 to identify the snapshot or active file system, an image state 21, a root block pointer 27, and an image name 29 as described below.

When the data storage system takes a snapshot of the file system it assigns the snapshot a unique version number such as a 32-bit unsigned integer that increases monotonically for each subsequent snapshot. The version number is not reused even as snapshots are deleted or made obsolete to the file system.

The image state can be one of the following states:
Active—representing the active file system
In-use snapshot—representing a snapshot that users can access
Free—representing available for writing by a snapshot or active file system
Deleted snapshot—representing a user has deleted the associated snapshot but a cleaner process or thread has not yet removed the space map block entry for this snapshot
Obsolete snapshot—representing a user has reverted to an earlier snapshot and the cleaner process or thread has not yet removed the space map block entry for this snapshot In an embodiment, when the data storage system takes a snapshot of the file system, the host provides a timestamp (e.g., time and date) when the snapshot or active data image was created. The root block pointer provides the address of the root block in the hierarchical structure of the snapshot and the image name is a character string used to easily identify the snapshot to users.

Figure 4:
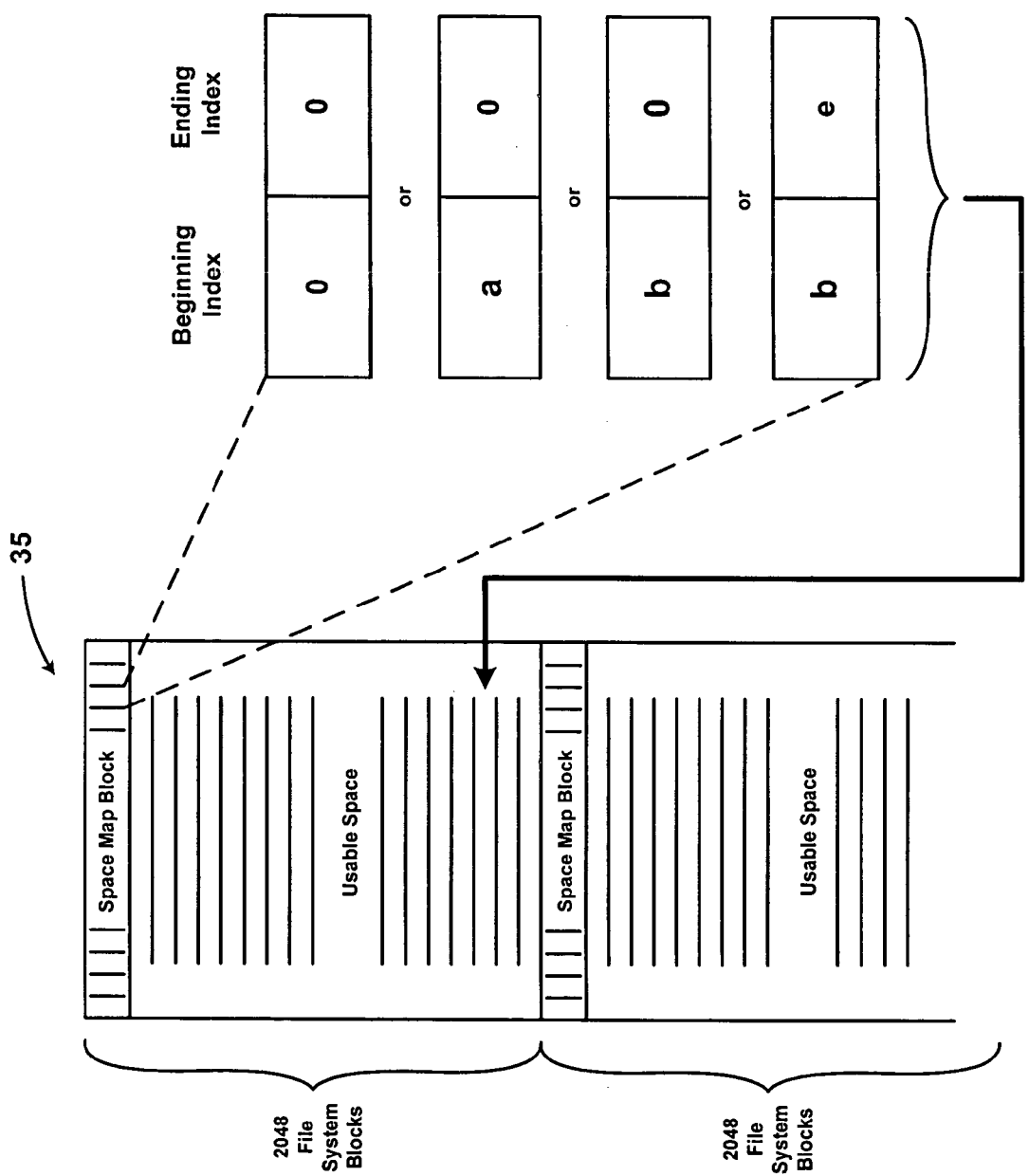
FIG. 4 illustrates details of the space map blocks and a block tracking and index system.

Referring to FIG. 4, the remainder of the data storage subsystem is allocated to space map blocks and usable space for data. Each space map block keeps track of the blocks in its usable space for data storage. For example, a space map block can keep track of 2,047 blocks of usable space. Each space map block entry contains a pair of indexes ("a space map block entry"), for example, 8-bits in length that represent any of 254 snapshots or the active file system. Each space map block entry is an index into the index table shown in FIG. 3. Each space map block entry has a beginning value b that indicates the first snapshot (i.e., snapshot b) and an ending value e that indicates the last snapshot (i.e., snapshot e) to use the associated block. Thus, each space map block entry (b, e) in the space map block is used to track the usage of an associated block in the usable space:

| Beginning Index, b | Ending Index, e | Meaning |
|---|---|---|
| 0 | 0 | The block is free to use by a snapshot or the active file system |
| 8-bit Integer | 0 | The block is in use by one or more snapshots and has not been changed since the first snapshot was taken. The block is also in use by the active file system |
| a | 0 | The block is in use by the active file system only and there are no snapshots associated with the block |
| 8-bit Integer | Another 8-bit Integer | The block is in use by a snapshot and is used by all subsequent snapshots through a last |

-continued

| Beginning Index, b | Ending Index, e | Meaning |
|---|---|---|
| | | snapshot. The data has changed since the last snapshot was created and is, therefore, no longer in use by the active file system |

In an alternative embodiment, each space map block entry contains a pair of version numbers (e.g., 32-bit) that represent snapshots or the active file system. Thus, each version pair (b, e) in the space map block would be used to track the usage of an associated block in the usable space.

Figure 5:
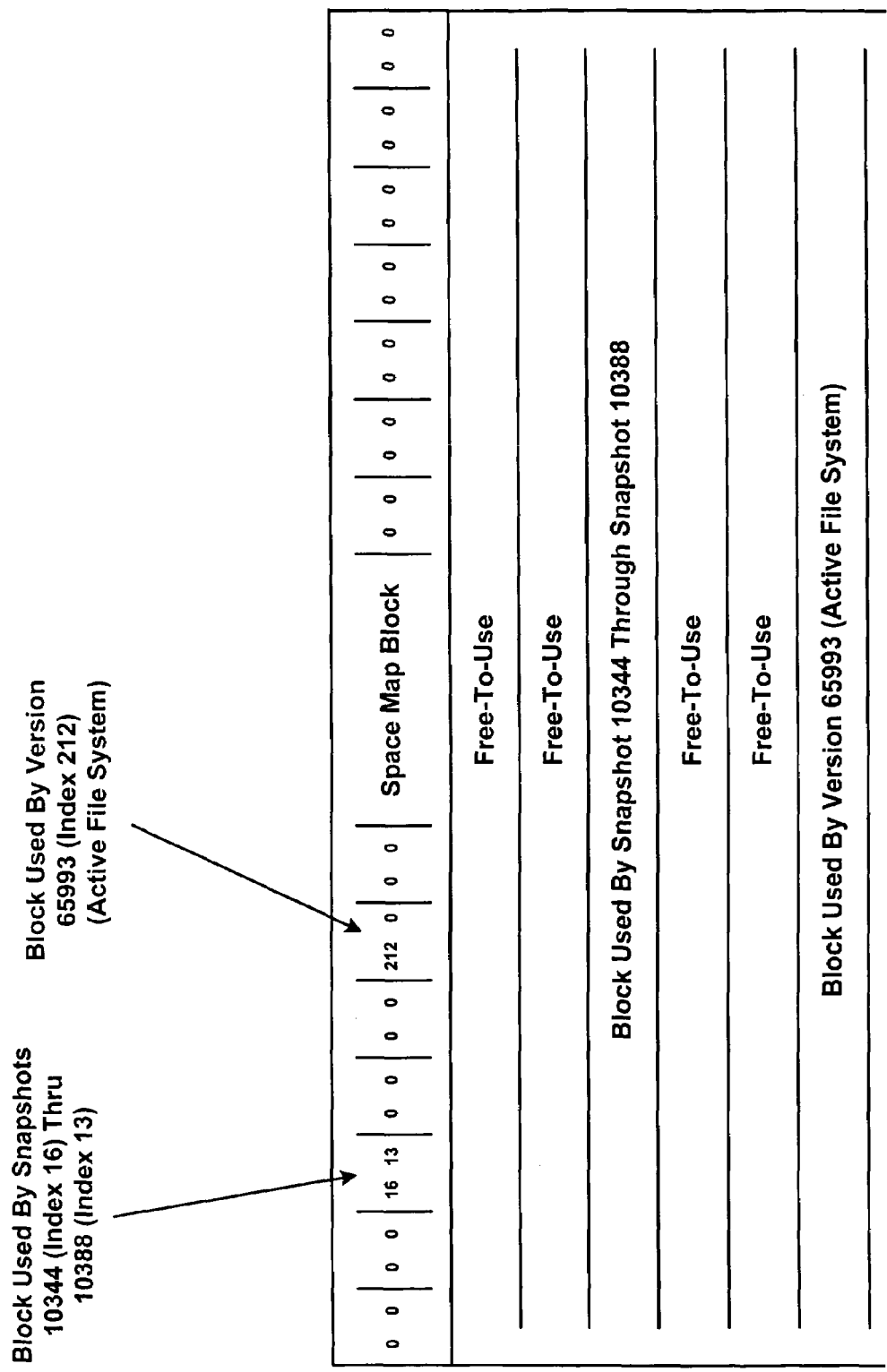
FIG. 5 illustrates examples of a snapshot tracking status in the space map blocks.

FIG. 5 illustrates how a space map block entry is used to track a block in the usable space. In an earlier stage of operation, the space map may contain many entries with beginning and ending values equal to zero indicating that many blocks in the data storage subsystem are free-to-use for snapshots or the active file system. At the same time, other blocks will be in-use that is allocated to snapshots or the active file system. FIG. 5 shows one such block used by snapshots assigned version number 10344 through version number 10388 inclusive. The space map block entry (16, 13) indicates the snapshots that use this block. The host associates the space map block entry with the version number of the snapshot by reading the index table. The space map block also contains space map block entry (212, 0) to show that the active file system, for example, assigned version number 65993 is using an associated block.

Figure 6:
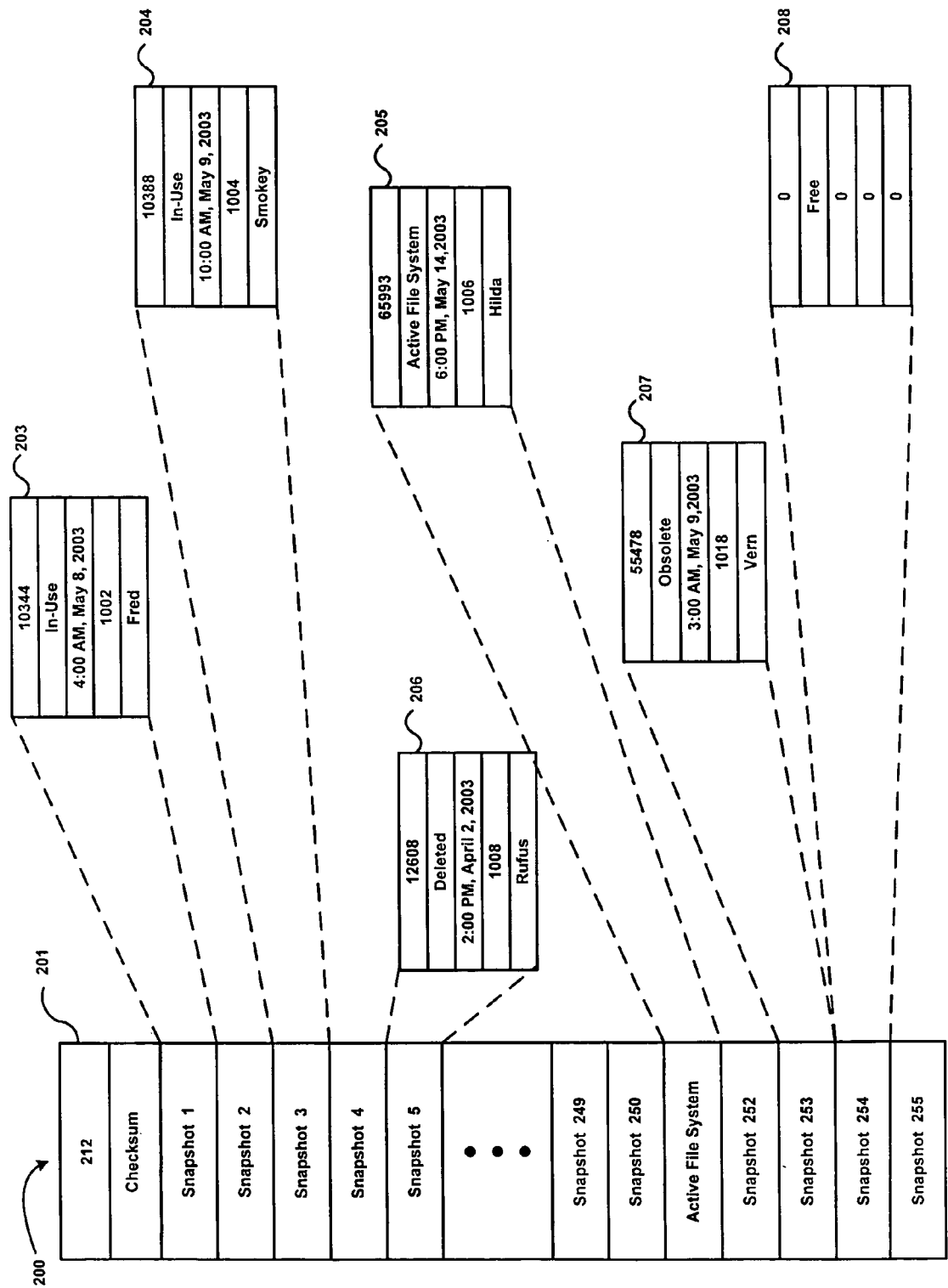
FIG. 6 illustrates details and examples of the snapshot table and snapshot table elements.

FIG. 6 illustrates the relationship between the index table 200 and the snapshot attributes and the active file system attributes. The table below illustrates the group of attributes 203, 204, 205, 206, 207, and 208 that are shown in FIG. 6:

| Index Table Entry | Version Number | Image State | Timestamp | Root block Pointer | Image Name |
|---|---|---|---|---|---|
| Snapshot 1 | 10344 | In-use | 4 AM, May 8, 2003 | 1002 | Fred |
| Snapshot 3 | 10388 | In-use | 10 AM, May 9, 2003 | 1004 | Smokey |
| Active File System | 65993 | Active File System | 6 PM, May 14, 2003 | 1006 | Hilda |
| Snapshot 5 | 12608 | Deleted | 2 PM, Apr. 2, 2003 | 1008 | Rufus |
| Snapshot 253 | 55478 | Obsolete | 3 AM, May 9, 2003 | 1010 | Vern |
| Snapshot 254 | 0 | Free | 0 | 0 | 0 |

Figure 7:
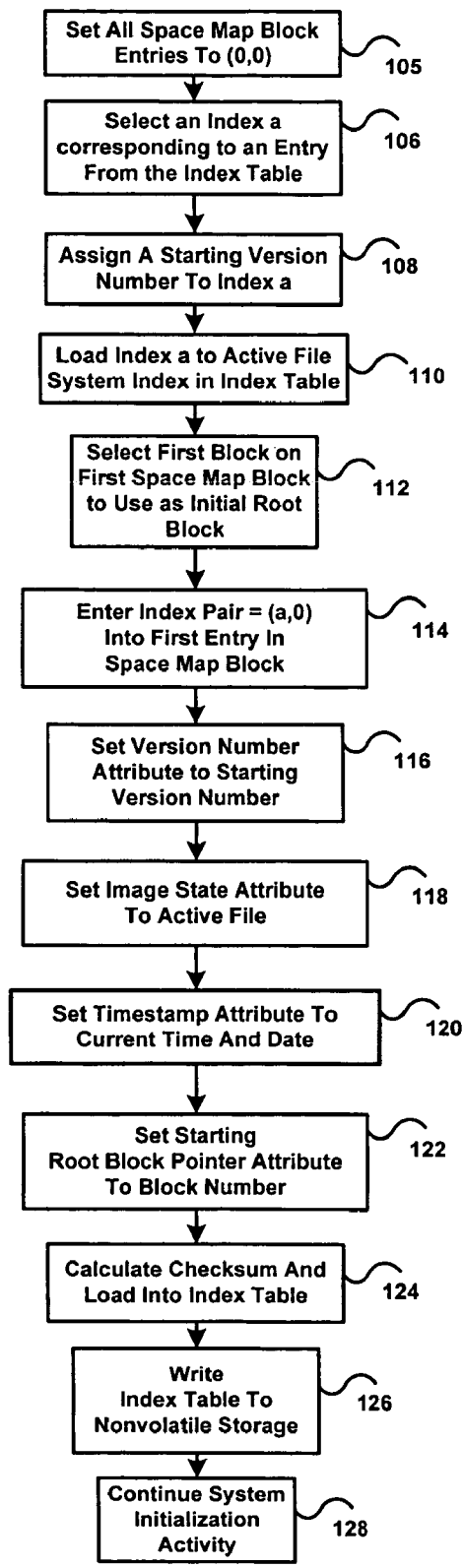
FIG. 7 illustrates a flow diagram for the creation of a file system.

FIG. 7 illustrates a flow diagram of a method for creating a file system. This method can occur during the process of initialization. In an embodiment, the initialization process has proceeded to the point where the next steps relate specifically to file system creation. Although the method is described serially below, the steps can be performed in parallel, for example, asynchronously or in a pipelined manner. There is no requirement the method be performed in the order shown except where indicated. Further, the steps are implemented by computer such as one or more host(s) described earlier. For brevity, we describe the methods as executed by a host.

Referring to step 105 of FIG. 7, the host sets all of the space map block entries equal to (0, 0). This indicates that the blocks corresponding to the entries are free-to-use. At step 106, the host selects an 8-bit index "a" that represents the active file system. At step 108, the host assigns a starting version number to index a. At step 110, the host loads index "a" into the index of the active file system 201 in the directory 200 (FIG. 6). At step 112, the host selects the first available space map block and at step 114 loads the beginning index 8-bit index "a" and an 8-bit ending index 0 into the first entry in the selected space map block. At step 116, the host sets the starting version number in the associated attributes for the active file system in index table entry "a". The host further sets the image state to active at step 118, the timestamp to the current date and time at step 120, and a starting root block pointer at step 122, calls an algorithm to verify the data integrity (e.g., checksum) of the snapshot attributes, and stores the results in index table entry "a" at step 124. At step 126, the host may write the index table to nonvolatile storage. In one embodiment, at step 128, the host continues with any other activities such as initialization. In another embodiment, the other activities can precede the creation of the file system.

Figure 8:
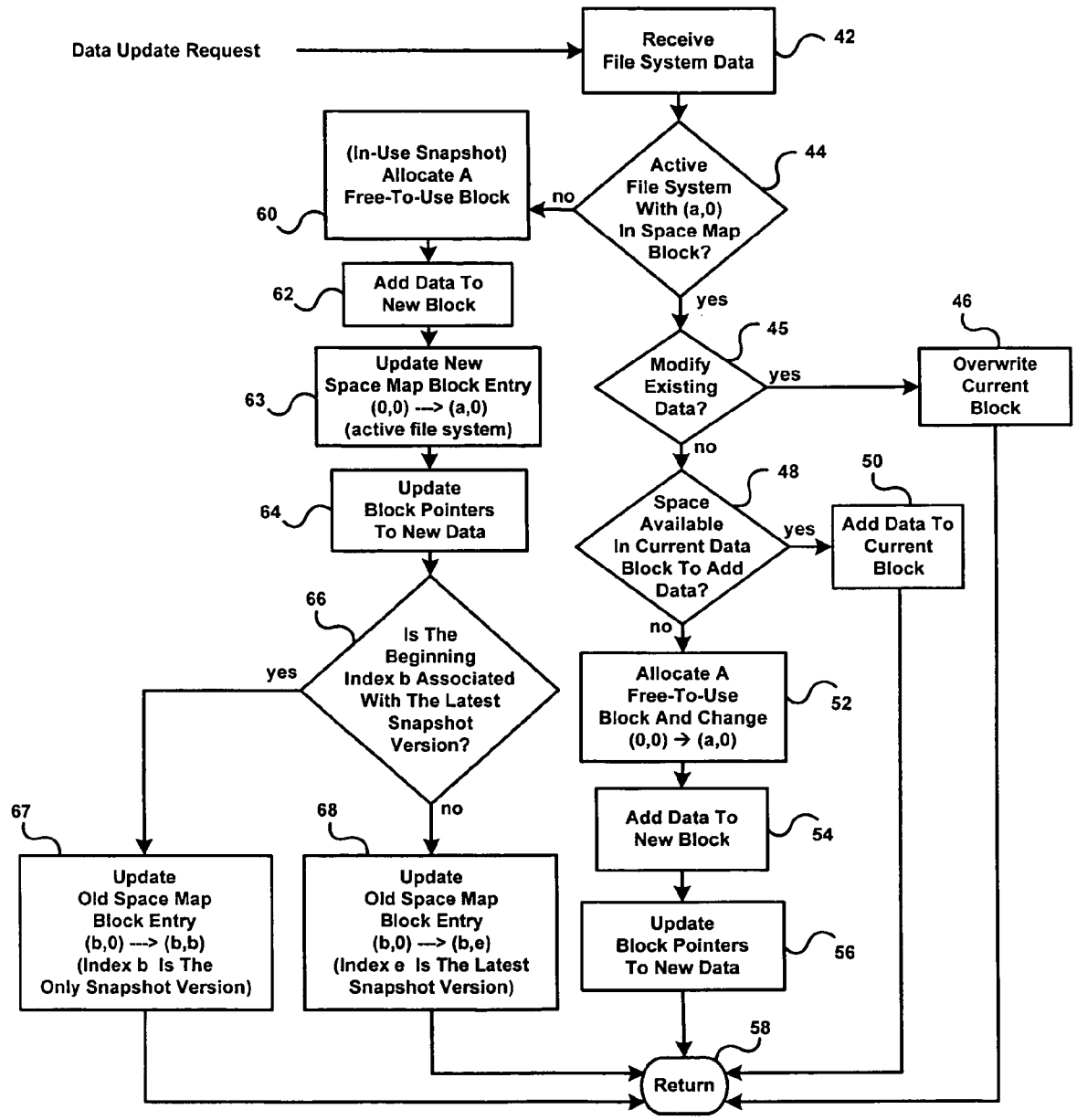
FIG. 8 illustrates a flow diagram for file system block management.

FIG. 8 illustrates a flow diagram of a method of block management. At step 42, the host receives a request to update the file system data. At step 44, the host reads the space map block entry of the associated received data to determine if that block is used by the active file system only. If yes, as indicated by the space map block entry=(a, 0), the host determines at step 45 whether or not the data is a modification of existing data or an addition to existing data. If the received data is a modification of existing data, the host overwrites the block at step 46 and returns to normal operation at step 58. If the received data is an addition to the existing data, the host determines at step 48 if the space available in the current block is enough to hold all of the received data. If yes, the host adds the received data to the current block at step 50 and returns to normal operation at step 58. If not, the host allocates a free-to-use block at step 52 to hold the additional data and changes the associated space map block entry from (0, 0)-->(a, 0). At step 54, the host adds the received data to the newly allocated block. At step 56, the host updates the file system block pointers to point to the new data. At step 58, the block management routine returns to normal system operation.

At step 44, if the space map block entry of the block associated with the received data indicates an in-use snapshot uses the block, that is, the space map block entry (b, 0), the host allocates a free-to-use block for the received data at step 60. At step 62, the host adds the received data to the new allocated block. At step 63, the host changes the space map block entry of the new allocated block from (0, 0)-->(a, 0) indicating the new block is used by the active file system only. At step 64, the host updates the file system block pointers to point to the new data. At step 66, the host determines if there are other in-use snapshots pointing to the same old block. If the index b is associated with the latest snapshot version number, there is no other in-use snapshots pointing to the same old block. Therefore, at step 67, the host updates the old space map block entry from (b, 0)-->(b, b) indicating snapshot b is the only snapshot pointing to the associated old block and that the old data has been modified since snapshot b was created. If the index b is not associated with the latest snapshot version number, there is another in-use snapshot pointing to the same old block. Therefore, at step 68, the host updates the old space map block entry from (b, 0)-->(b, e) to indicate that snapshot b is the beginning snapshot and snapshot e is the ending snapshot (i.e., current in-use snapshot with the latest snapshot version number) pointing to the associated old block. In this case, there may be other snapshots with version numbers less than snapshot e and greater than snapshot b pointing to the same old block. In either case, the block management routine returns to normal system operation at step 58.

Figure 9:
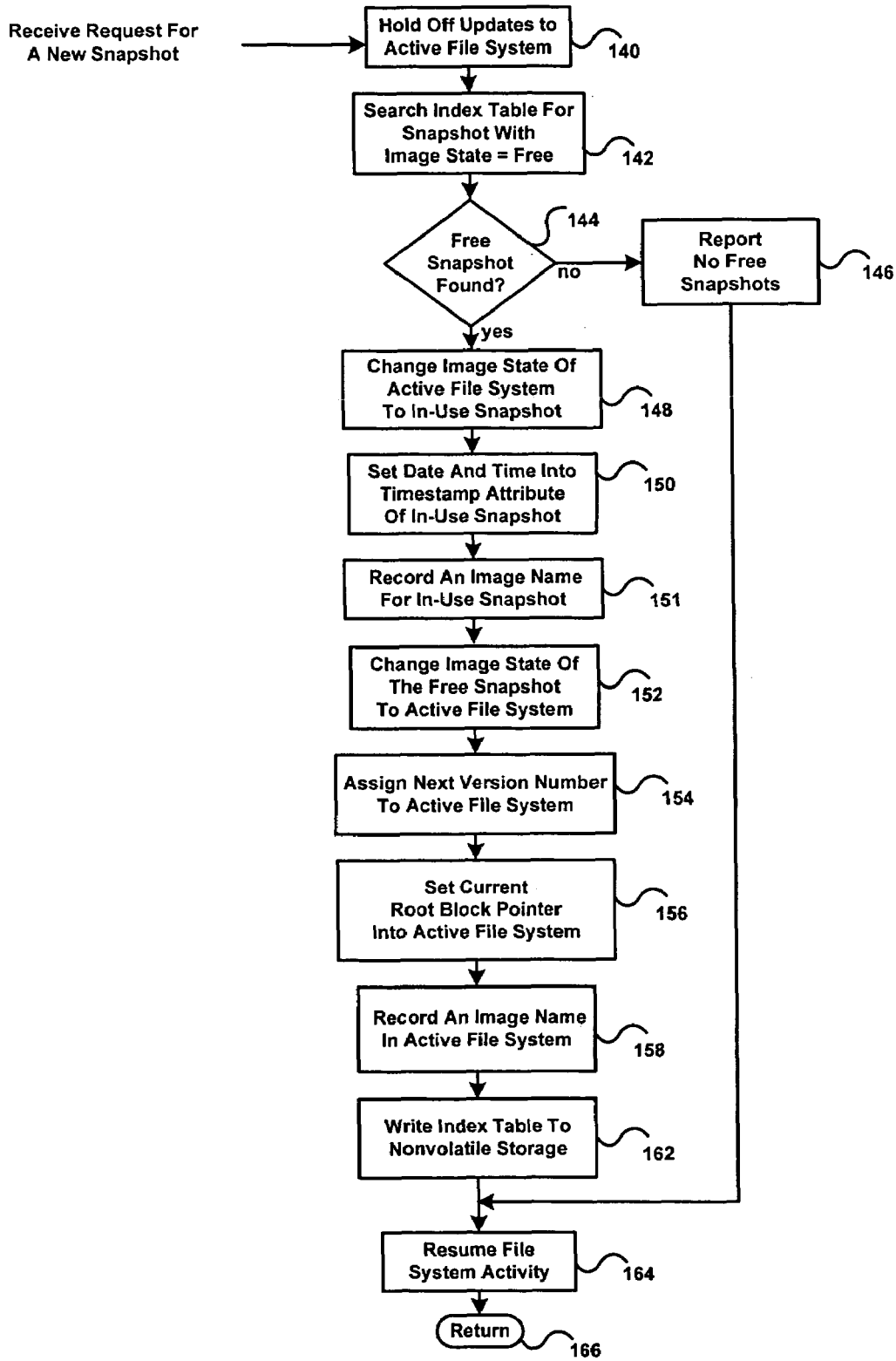
FIG. 9 illustrates a flow diagram for the creation of a file system snapshot.

FIG. 9 illustrates a flow diagram of a method of creating a snapshot. After receiving a request for a new snapshot of the file system, the host holds off from updating the active file system at step 140. At step 142, the host searches through the index table for the first snapshot with an image state equal to free. At step 144, if the host searches the entire index table and does not find a free image state, the routine reports no free snapshots and the host resumes normal file system operation at step 164 and if appropriate, the operator can delete some snapshots. If, at step 144, a free image state is found, the host changes the active file system's image state to in-use at step 148. At step 150, the host enters a timestamp of the new in-use snapshot. When this snapshot is created, the version number and the root block pointer remain as they were when the block was allocated to the active file system. At step 151, the host assigns a user-friendly image name for the in-use snapshot. This completes creation of the new snapshot. Next, the host establishes an active file system for normal use. At step 152, the host changes snapshot attributes containing the image state free to the active file system. At step 154, the host assigns the next version number to the new active file system. At step 156, the host enters the current root block pointer (same as the new snapshot) in the attributes of the active file system. At step 158, the host saves a user-friendly image name of the active file system. The snapshot table is written to nonvolatile storage at step 162. The host returns to normal operation at step 164.

Figure 10:
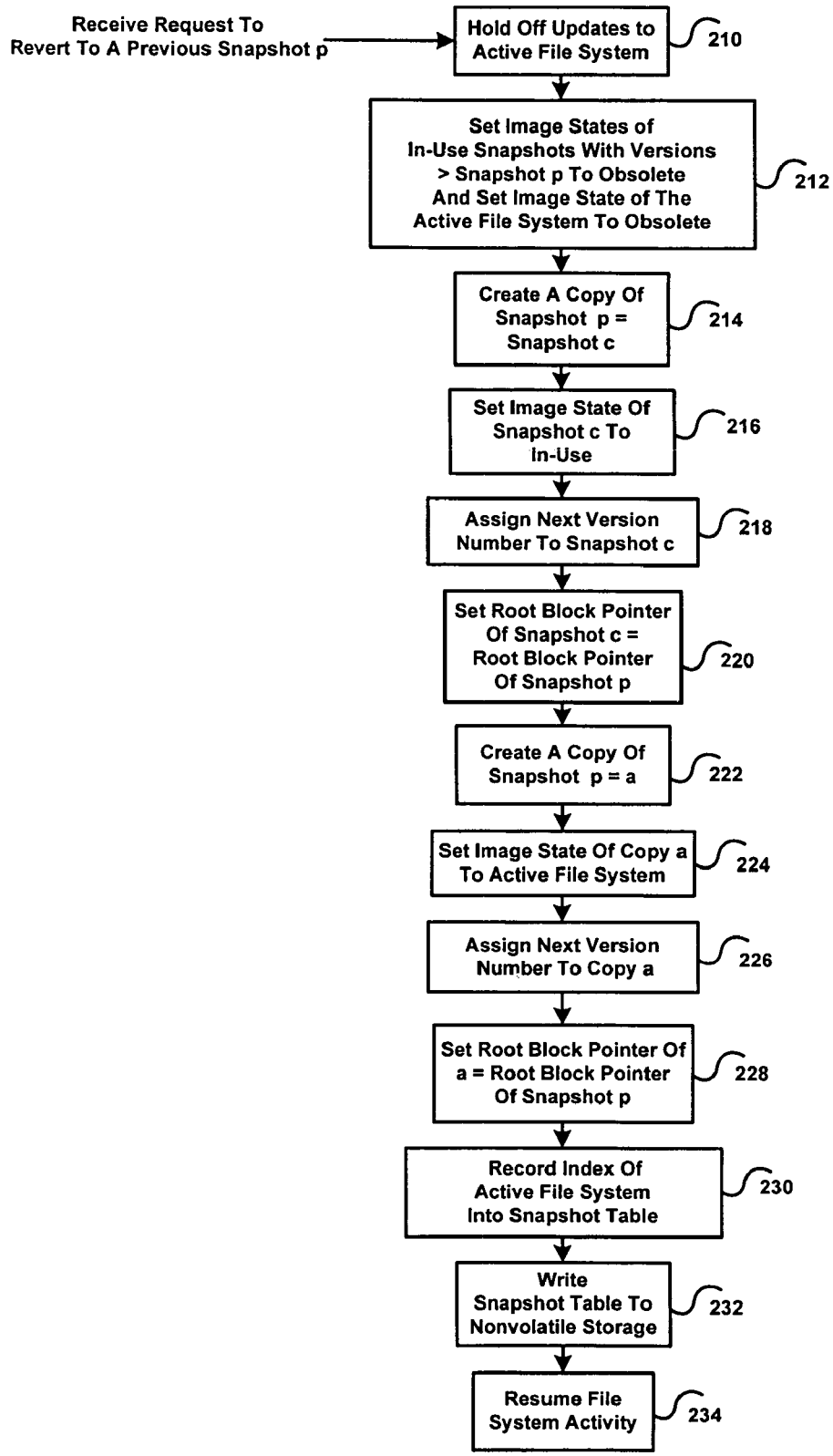
FIG. 10 illustrates a flow diagram of a method to obsolete a file system snapshot.
Figure 15A:
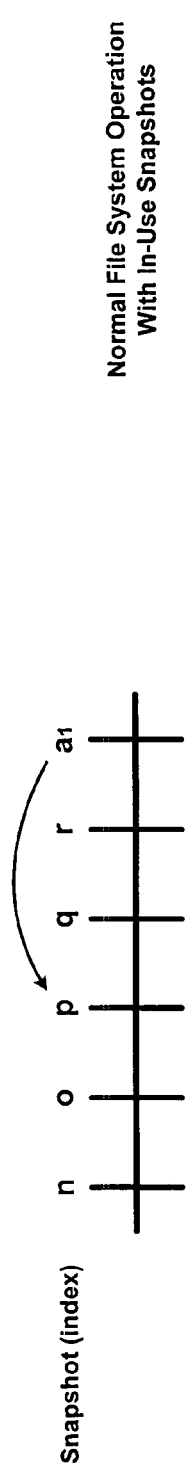
FIG. 15a illustrates a diagram of an active file system with a request to revert to an earlier snapshot.
Figure 15B:
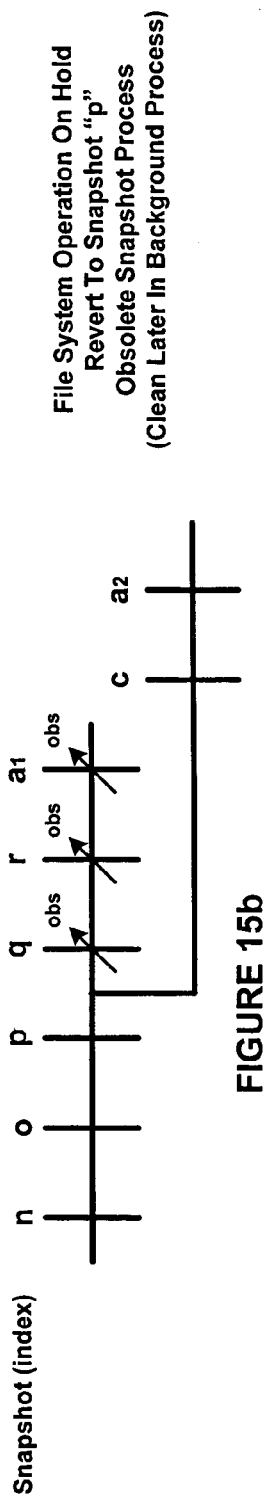
FIG. 15b illustrates a diagram of an active file system on hold to obsolete snapshots after the earlier snapshot.

FIG. 10 illustrates a flow diagram for a method used to revert to an earlier version of a snapshot. FIGS. 15a and 15b illustrate diagrams of the method of reversion. At times it is desirable or necessary to revert to an earlier version of the file system. An earlier version of the file system is any previous snapshot of the active file system. Once a previous snapshot is selected, the host discards all versions of the file system after the chosen version, including the current active file system. After receiving a request to revert to the previous snapshot, for example, snapshot p shown in FIG. 15a, the host will hold off updates to the current active file system at step 210. At step 212, the host changes the image state of all snapshots after snapshot p from in-use to obsolete and changes the image state of the active file system from active to obsolete (See FIG. 15b). At step 214, the host makes a copy of snapshot p, for example, called snapshot c. Snapshot c is used to receive any updates to space map block entry (p, 0) that were held off during the process of reverting to the previous snapshot version. This permits snapshot p to be preserved in its present state after the system is brought back to an active image state, while at the same time, not losing the pending updates. At step 216, the host sets the image state of snapshot c to in-use. At step 218, the host assigns the next unused version to snapshot c. At step 220, the host sets the root block pointer of snapshot c to the same root block pointer of snapshot p. At step 222, the host creates another copy of snapshot p, for example, called copy a. The copy a will become the active file system of the desired image of snapshot p. At step 224, the host sets the image state of copy a to the active file system. At step 226, the host assigns the next version number to copy a. At step 228, the host sets the root block pointer of copy a to the same root block pointer of snapshot p. At step 230 the host records index a of the active file system into the index table 200 (FIG. 3). At step 232, the host writes the index table to nonvolatile storage. At step 234, the host returns to normal file system activity.

Figure 11B:
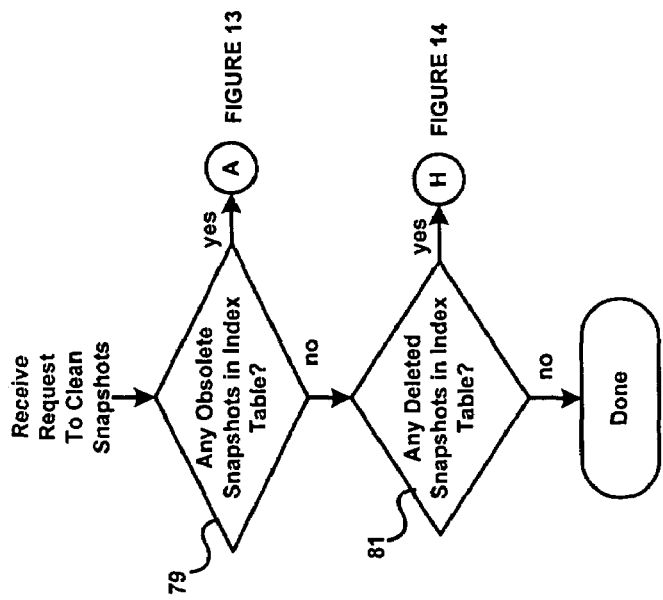
FIG. 11 illustrates a flow diagram of a method to delete a snapshot and for a method to clean unneeded snapshots from space map blocks.
Figure 11A:
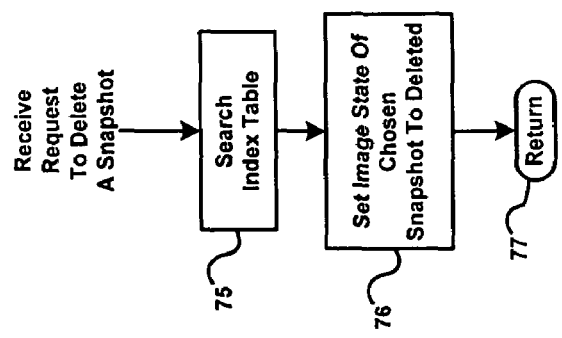
Figure 15C:
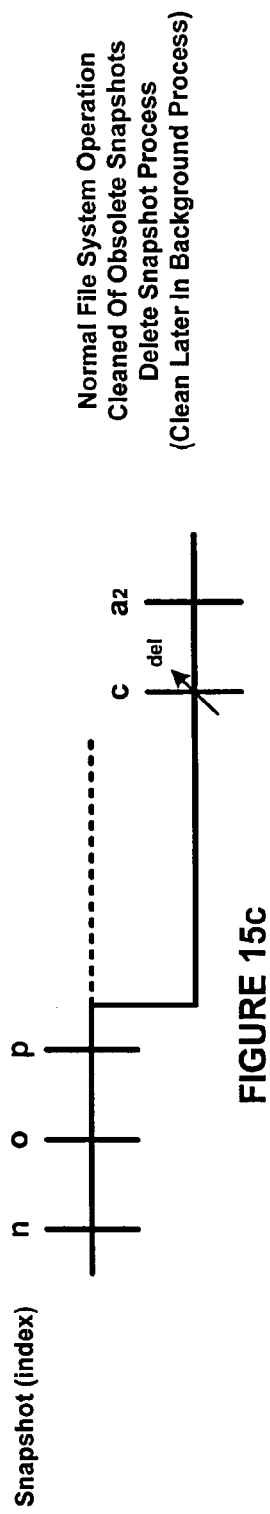
FIG. 15c illustrates a diagram of the cleaning of the obsolete snapshots.
Figure 15D:
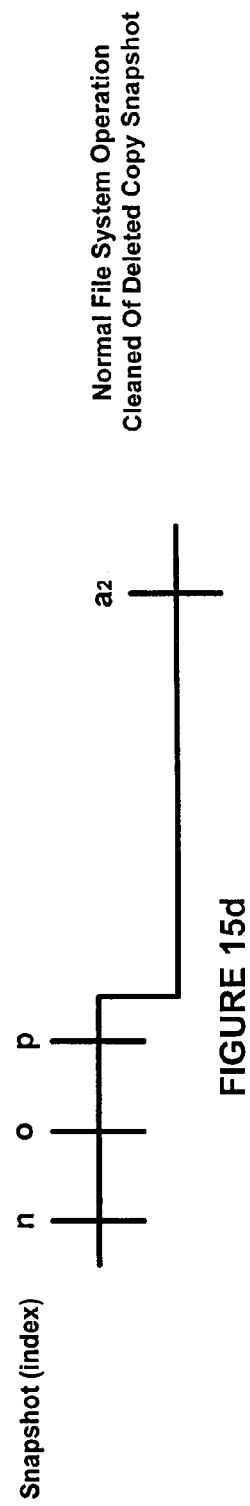
FIG. 15d illustrates a diagram of the file system after reversion to the earlier snapshot.

FIG. 11a illustrates a flow chart for a method to delete a snapshot. At step 75, after receiving a request to delete a snapshot (see also FIG. 15c) the host searches the index table for the requested snapshot. At step 76, the host sets the image state of the requested snapshot to deleted. At step 77, the host returns to normal file system operation.

FIG. 11b illustrates a high level flow chart for cleaning deleted and obsolete snapshots from the space map blocks and index table of the file system. At step 79, the host determines if any obsolete snapshots exist. If yes, the host goes to reference A in FIG. 13 to clean obsolete snapshots from the space map blocks. If not, the host goes to step 81 and determines if any deleted snapshots exist. If not, then no work needs to be done and the method is complete. At step 81, if a deleted snapshot is found, the host goes to reference H in FIG. 14 to clean deleted snapshots from the space map blocks and index table of the file system.

Figure 13:
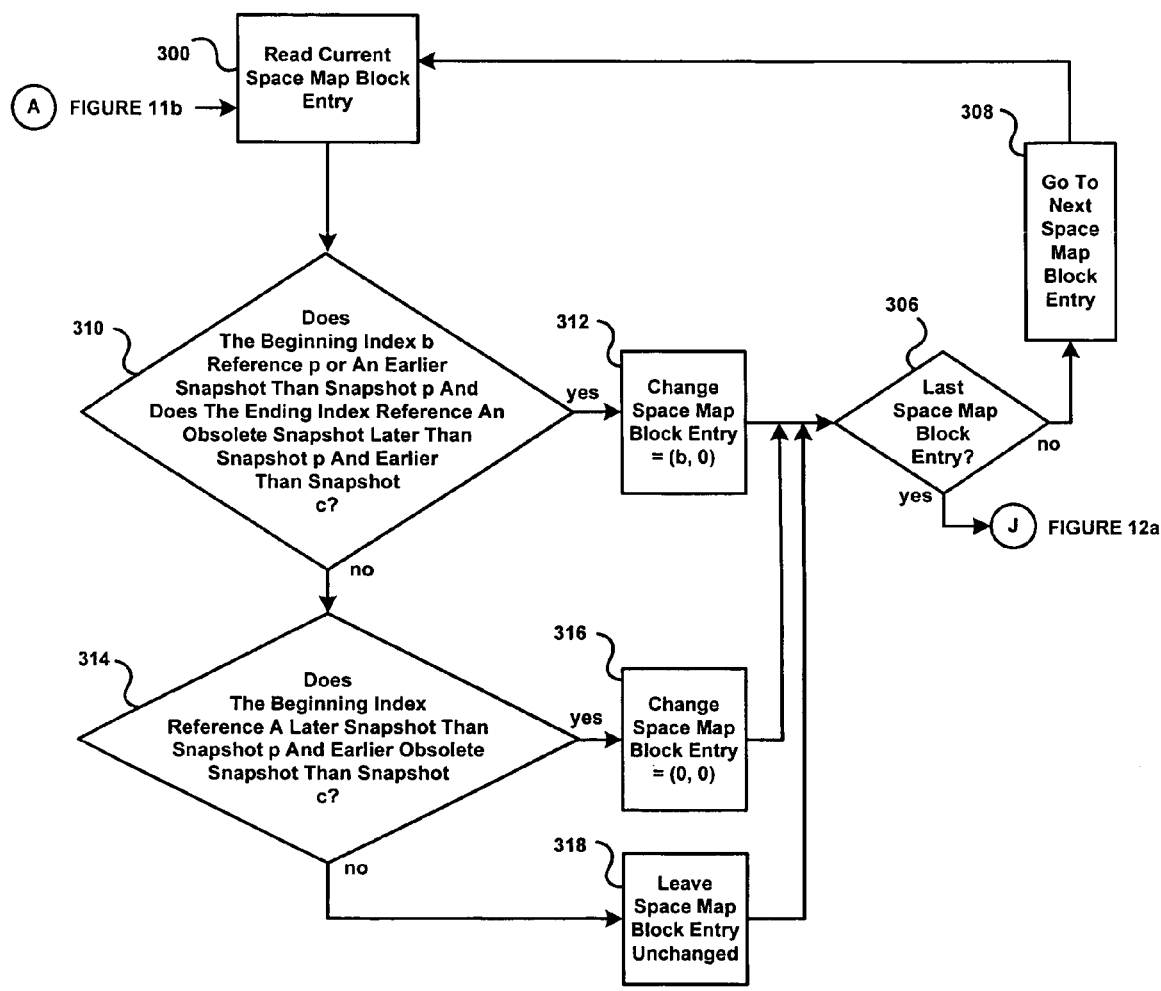
FIG. 13 illustrates a flow diagram of a method to clean obsolete snapshot indexes from space map block entries.

FIG. 13 illustrates the detailed flow chart for cleaning obsolete snapshots from space map block entries after a reversion to snapshot p. Step 300 examines each space map block entry one by one in the file system. Step 310 tests whether the beginning index of the space map block entry either matches the snapshot p to which we reverted or precedes snapshot p while the ending index refers to an obsolete snapshot later than p and earlier than c, the snapshot copy created in step 220 on FIG. 10. If the space map block entry matches these conditions, step 312 changes the space map block entry to (b, 0) to indicate that the block is now in use by the active file system.

Step 314 tests if the beginning index of the space map block entry indicates a snapshot later than the reverted-to snapshot p and the ending index indicates an obsolete snapshot earlier than the copy snapshot c. If so, step 316 sets the space map block entry to (0, 0) to indicate that the entry is free-to-use since no snapshot any longer references it.

If neither of the conditions tested by steps 310 or 314 are true, then step 318 leaves the space map block entry unchanged.

After executing step 312, 316, or 318, step 306 tests if we have processed the last space map block entry in the file system. If we have processed the last entry, processing continues at Reference J on FIG. 12a to remove the index table entry for all the obsolete snapshots. Otherwise, step 308 moves to the next space map block entry and processing continues at step 300.

Figure 12B:
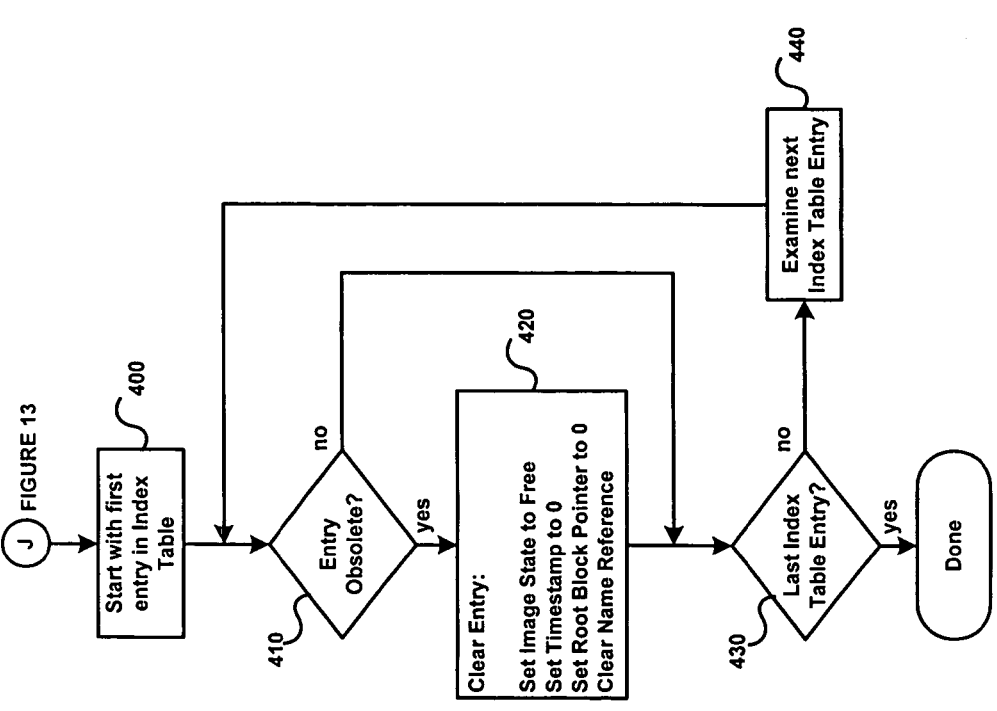
FIG. 12 illustrates a flow diagram of a method to remove obsolete snapshots from the index table and for a method to remove deleted snapshots from the index table.
Figure 12A:
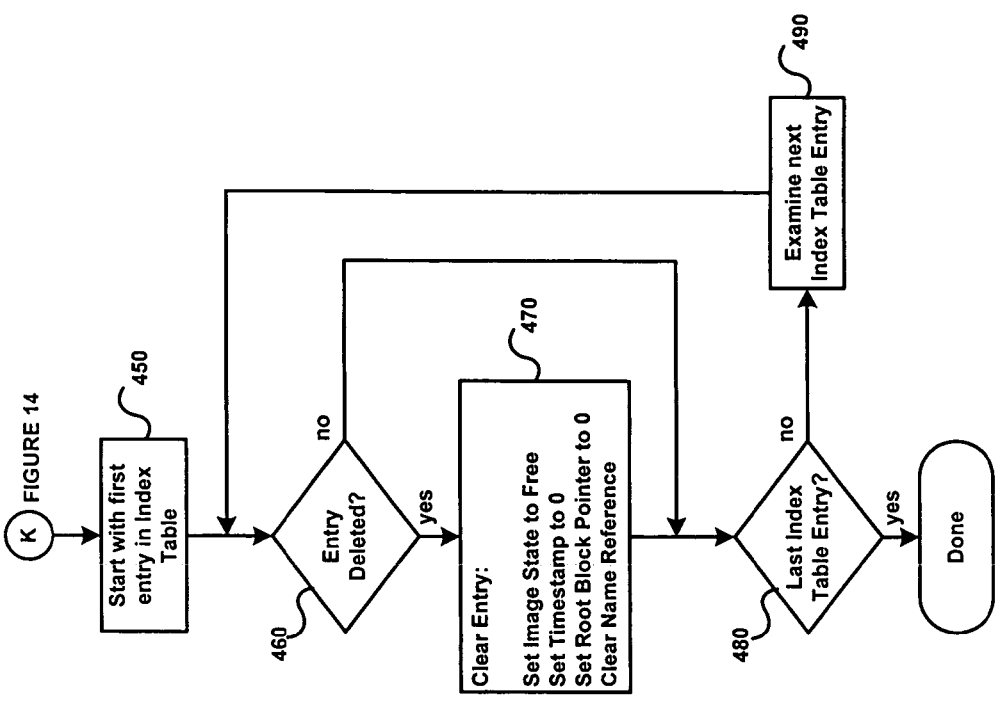

After completing the processing of all obsolete snapshots in the space map blocks, processing continues at Reference J on FIG. 12a to remove the index table entries corresponding to obsolete snapshots. Processing begins at the first index table entry in step 400. Step 410 tests if the index table entry is obsolete. If so, step 420 clears the index table entry by setting the image state to free-to-use, the timestamp to 0, the root block pointer to 0, and by clearing the name reference. Step 430 tests if we have processed the last index table entry. If this is not the last index table entry, step 440 moves to the next index table entry and processing continues at step 410. After all index table entries have been processed, all obsolete snapshots have been completely removed from the file system.

Figure 14:
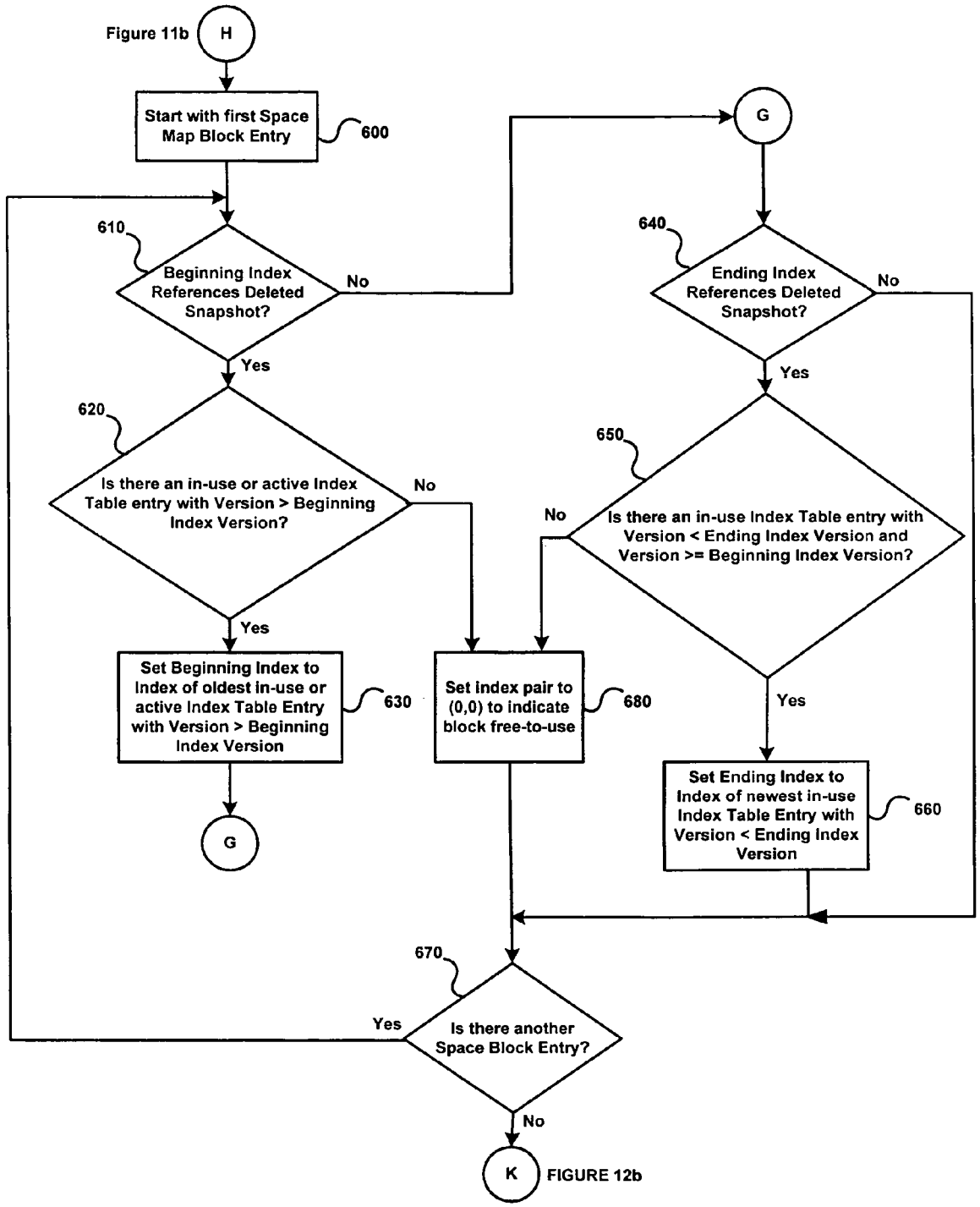
FIG. 14 illustrates a flow diagram of a method to clean deleted snapshot indexes from space map block entries.

Returning to FIG. 11b, if step 81 detects any deleted snapshots in the index table, processing continues at Reference H on FIG. 14. On FIG. 14, step 600 begins with the first space map block entry. Step 610 tests if the beginning index of the space map block entry references a deleted snapshot. If yes, then step 620 tests for any active file system or in-use snapshot with a version later than the beginning space map block entry index. If no snapshot or active file system is found later than the space map block entry beginning index, then step 680 sets the entry to (0, 0) to indicate the corresponding block is free to use. If a later snapshot or active file system is found, step 630 sets the beginning index of the space map block entry to the index of the found snapshot or active file system and continues processing at Reference G on the same sheet.

Step 640 similarly tests the ending index of the space map block entry to see if it references a deleted snapshot. If so, step 650 tests if there is a snapshot with version less than the current ending index and later than or equal to the version of the beginning index. If not, step 680 sets the space map block entry to (0, 0) to indicate that the block is free-to-use. Otherwise, step 660 sets the ending index to the latest in-use snapshot before the current ending index.

After completion of either step 660 or 680, step 670 tests for another space map block entry. If there are more space map block entries to process, control returns to step 610. After all space map block entries have been processed, control resumes at Reference K on FIG. 12b to remove index table entries for deleted snapshots.

Figure 16:
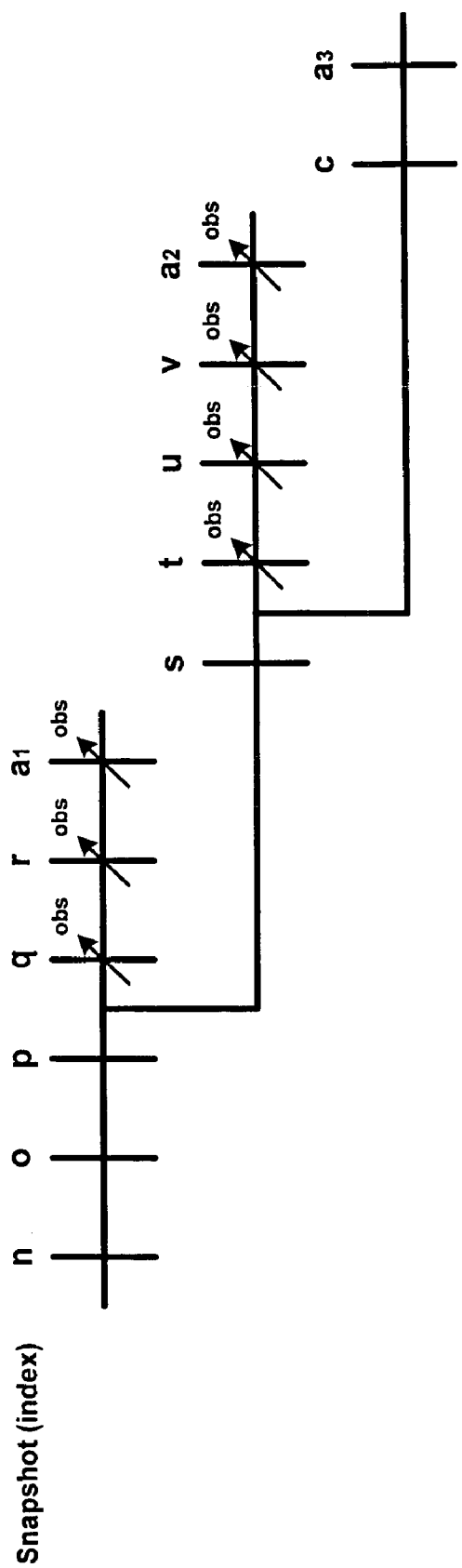
FIG. 16 illustrates a diagram of multiple reversions to earlier snapshots.

FIG. 16 illustrates a diagram of a case where a second reversion to a prior snapshot s has occurred before the background cleaning process for the first reversion to snapshot p has completed. As the file system reverts to a prior snapshot, a pending list is maintained to record the indexes and associated version numbers of the affected snapshots each time the reversion process is invoked. If the file system reverts to more than one snapshot over a span of time where the background cleaning process has not completed, the pending list organizes the cleaning activity by individual reversion event to maintain data reliability of the snapshots. Multiple reversions are likely to occur in large and/or high activity test environments.

What is claimed is:

1. A method of snapshot management in a data storage system that maintains multiple snapshot versions and an active file system, comprising:
   (a) maintaining an index table that contains an entry for each snapshot and the active file system, wherein the index table entry includes one or more attributes selected from a group of attributes comprising a version number, an image state, a time stamp, a root block pointer, and an image name;
   (b) maintaining a space map block entry (b, e), wherein b and e represent index table entries, b indicates a first snapshot that uses a first block, and e indicates a last snapshot that uses the first block;
   (c) allocating a second block;
   (d) writing data in the second block; and
   (e) updating any other blocks that pointed to the first block to point to the second block.

2. A method of snapshot management in a data storage system, comprising:
   (a) maintaining an index table in a memory, wherein the index table includes an entry for a first snapshot having a first timestamp and a second snapshot having a second timestamp; and
   (b) maintaining a space map block entry (b, e) in the memory, wherein b and e represent index table entries, b indicates a first snapshot that uses a first block, and e indicates a last snapshot that uses the first block, wherein the space map block entry, the index table entry corresponding to b, and the index table entry corresponding to e track the first snapshot and the last snapshot that use the first block.

3. The method of claim 2, wherein the space map block entry indicates the first block is free to use.

4. The method of claim 2, wherein the space map block entry indicates the first block is only in use by an active file system.

5. The method of claim 2, wherein the space map block entry indicates the first block is in use by a snapshot.

6. The method of claim 2, wherein the space map block entry indicates the first block is not modified after being used by a snapshot.

7. The method of claim 2, wherein the space map block entry indicates the first block is used by one or more snapshots but not the active file system.

8. The method of claim 2, wherein the index table includes an entry for an active file system.

9. A method of block management in a host, comprising:
  maintaining an index table with entries, wherein each entry includes a timestamp;
  receiving a request to update a block; and
  reading a first space map block entry with a beginning index and an ending index to determine if the block is used by an active file system only,
  if so, overwriting the block, and
  if not, allocating a free-to-use block, writing on the free-to-use block, and updating the ending index to the index of the snapshot with the last timestamp in the index table.

10. The method of claim 9, further comprising updating a beginning index of a second space map block entry to an active file system version.

11. The method of claim 9, further comprising updating a root block pointer to the free-to-use block.

12. A method of block management in a host, comprising:
  (a) maintaining an index table, wherein each entry includes a timestamp;
  (b) receiving a request to write data;
  (c) updating a space map block entry associated with a first data block, wherein the space map block entry includes a beginning index and an ending index, wherein the beginning index corresponds to an entry in the index table that has the timestamp of an active file system and wherein the ending index has a zero entry that indicates a block in use by the active file system; and
  (d) writing the data to the first data block.

13. The method of claim 12, further comprising:
  (f) creating a snapshot after step (e);
  (g) receiving another request to write data to the first data block after step (f);
  (h) updating the ending index to indicate the snapshot;
  (i) allocating a second data block; and
  (j) writing the data to the second data block.

14. The method of claim 13, further comprising:
  (k) copying the first data block to the second data block before overwriting a part of the second data block.

15. The method of claim 14, further comprising:
  (l) deleting the snapshot; and
  (m) modifying the space map block entry to indicate the first data block is free to use.

16. A method of snapshot management in a data storage system, comprising:
  (a) maintaining an index table in a memory, wherein the index table includes an entry for a first snapshot version and a second snapshot version; and
  (b) maintaining a space map block entry (b, e) in the memory, wherein b and e represent index table entries, b indicates a first snapshot that uses a first block, and e indicates a last snapshot that uses the first block, wherein the space map block entry, the index table entry corresponding to b, and the index table entry corresponding to e track the first and last snapshot versions that use the first block.

* * * * *